(No Model.)
W. M. HOLMES.
APPARATUS FOR RAISING AND LOWERING HARVESTER PLATFORMS.
No. 475,862. Patented May 31, 1892.
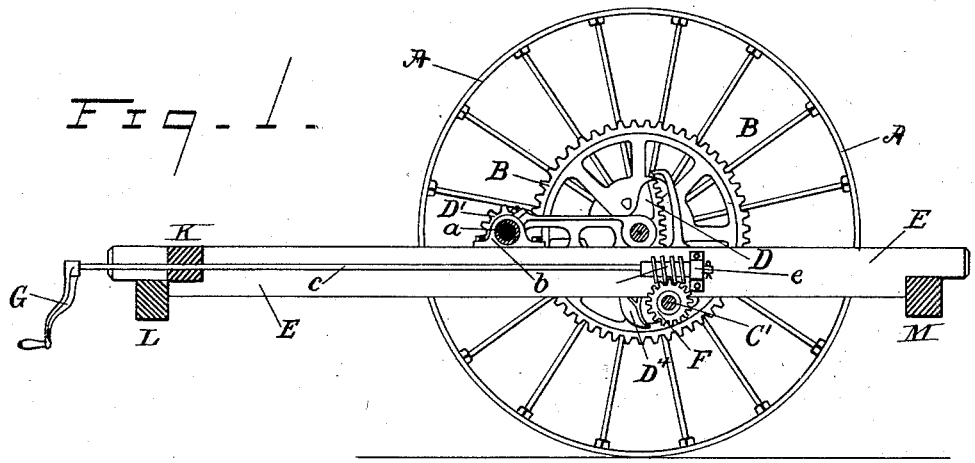
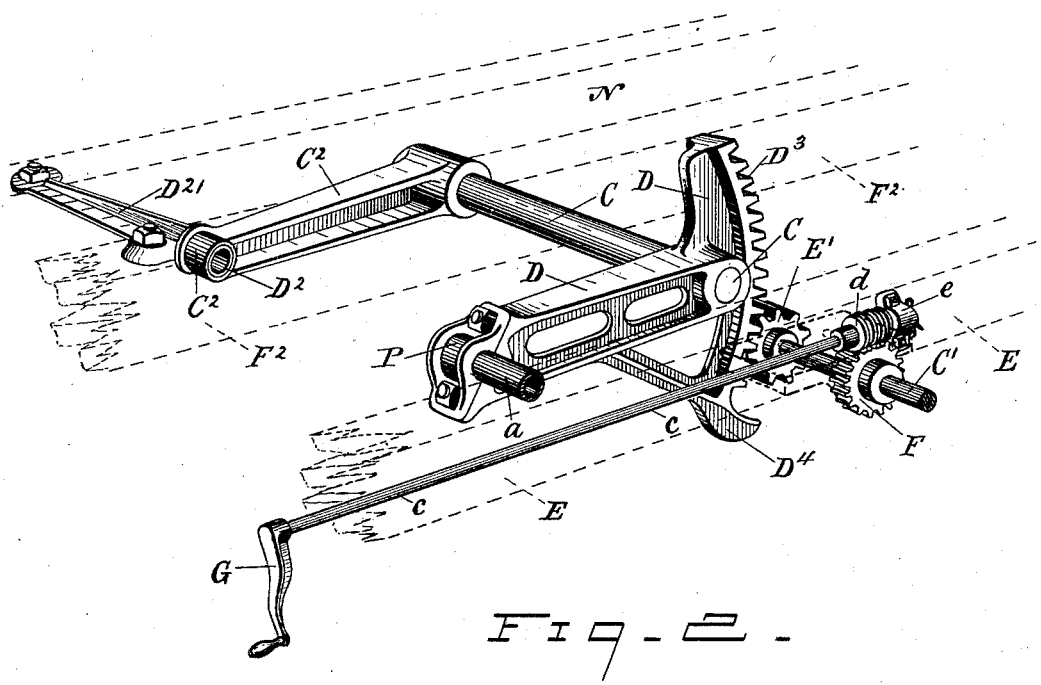
WITNESSES=
INVENTOR=
Watson M. Holmes
by Franklin Scott
Attorney

United States Patent Office.

WATSON M. HOLMES, OF HOOSICK FALLS, NEW YORK.

APPARATUS FOR RAISING AND LOWERING HARVESTER-PLATFORMS.

SPECIFICATION forming part of Letters Patent No. 475,862, dated May 31, 1892.

Application filed April 27, 1887. Serial No. 236,277. (No model.) Patented in England May 15, 1886, No. 6,566.

*To all whom it may concern:*

Be it known that I, WATSON M. HOLMES, of the village of Hoosick Falls, in the county of Rensselaer and State of New York, have invented certain Improvements in Harvester-Platform Adjusters, of which the following description, in connection with the accompanying sheet of drawings, constitutes a specification.

This invention was patented in Great Britain by Letters Patent No. 6,566, bearing date May 15, 1886.

This invention relates to special devices for adjusting the elevation of the main frame of a harvester with reference to the main driving-wheel.

The drawings fully illustrate the invention.

Figure 1 exhibits a vertical longitudinal section of a harvester-frame, showing the main driving-wheel connected therewith. Fig. 2 is a perspective view of my special apparatus with the driving-wheel detached.

The main timbers of the frame are shown at E, $F^2$, K, L, and M. Three cross-girts E, $F^2$, and N are shown in Fig. 2 in dotted lines. The main driving-wheel A runs between girts E and $F^2$.

When all parts of the machine are assembled, driving-wheel A is journaled on spindle C. (Seen in Fig. 2.) The ends of spindle C are rigidly connected with the outer ends of the swinging arms $C^2$ and D. Arm $C^2$ is pivoted on a stud $D^2$, which projects from the end of bracket $D^{21}$, which in turn is bolted to girts $F^2$ and N. Swinging arm D is provided with the segment $D^3$, which engages with pinion E' and is actuated thereby. To its rear end the stud-bracket P is bolted, from which the journal-stud $a$ projects laterally. This stud turns in stationary box $b$, Fig. 1, which is bolted to the top of girt E. Stud $a$ is bored for the reception of the shaft which carries the driven pinion D', which engages with and is actuated by the driving-gear B, connected with the main driving-wheel A. Pinion E' is fitted on shaft C', which runs in a box bolted to the under side of girt E. Shaft C' has a worm-gear F fitted on the end thereof outside of its box, which is operated by worm $d$, fixed upon the inner end of the rod $c$, mounted in the box $e$, attached to the side of the girt E, driven by crank G. The guard $D^4$ prevents running pinion E' out of mesh with segment $D^3$.

The operation of the parts is obvious. Rotation of worm $d$ by means of the hand-crank G will effect the rotation of shaft C' and pinion E', thereby causing segment $D^3$ of arm D to swing on its axis of movement $a$, and thus the frame is caused to rise or fall in accordance with the rotation of crank G, either in one direction or the other.

I am aware that swinging toothed sectors to which the drive-wheel is attached, arranged in pairs and actuated by a stationary pinion-gear, have heretofore been used. My invention is distinguished from such by the use of but a single-toothed sector and a single actuating-pinion. This possesses material advantages over a pair, as a considerable weight of castings is dispensed with, and consequently the machine is greatly lightened.

Hence I claim as my invention—

The combination, in a harvester-frame adjuster, of a driving-wheel, two swinging arms, each pivoted at one end to a stationary journal-stud on the main frame and rigidly united at their outer ends by a spindle on which the driving-wheel revolves, one only of said arms being provided with a toothed segment having a guard at its bottom end to prevent its co-operating pinion from running out of mesh therewith, a pinion-shaft mounted on the main frame and carrying a pinion-gear which engages with said segment, and a worm-gear which is actuated by a worm on a crank-shaft which is attached to the frame or other convenient support therefor, constructed and arranged to operate substantially in the manner described, and for the purposes specified.

In testimony whereof I have hereto subscribed my name this 16th day of February, 1887.

WATSON M. HOLMES.

In presence of—
 FRANKLIN SCOTT,
 T. E. LYNCH.